DRIVE UNIT MOUNTING STRUCTURE

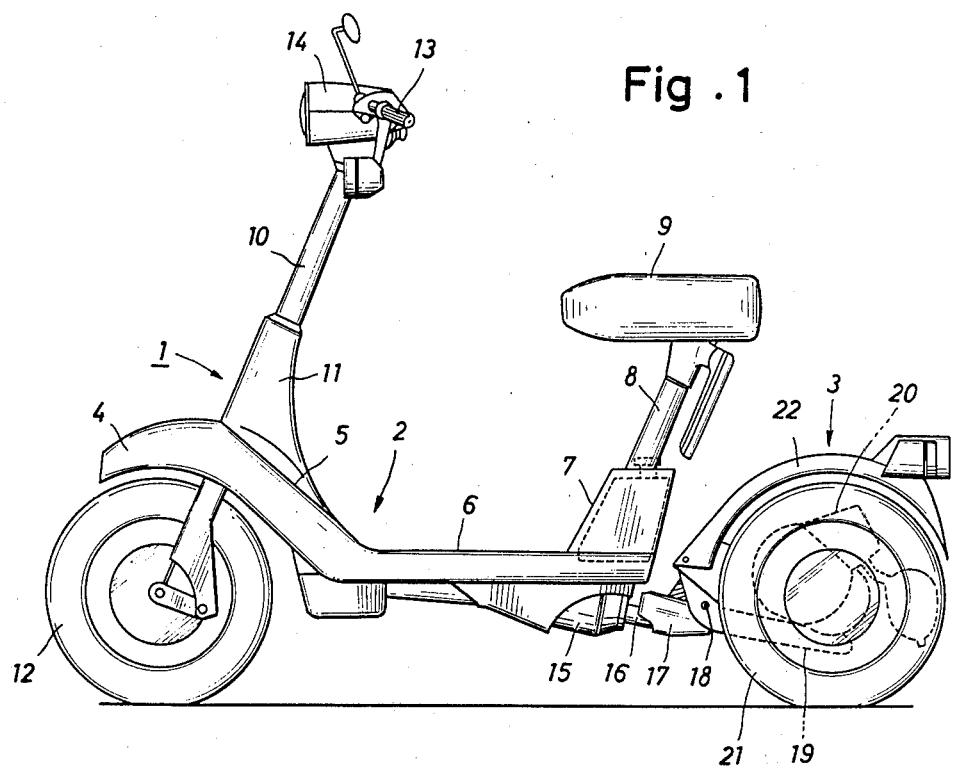
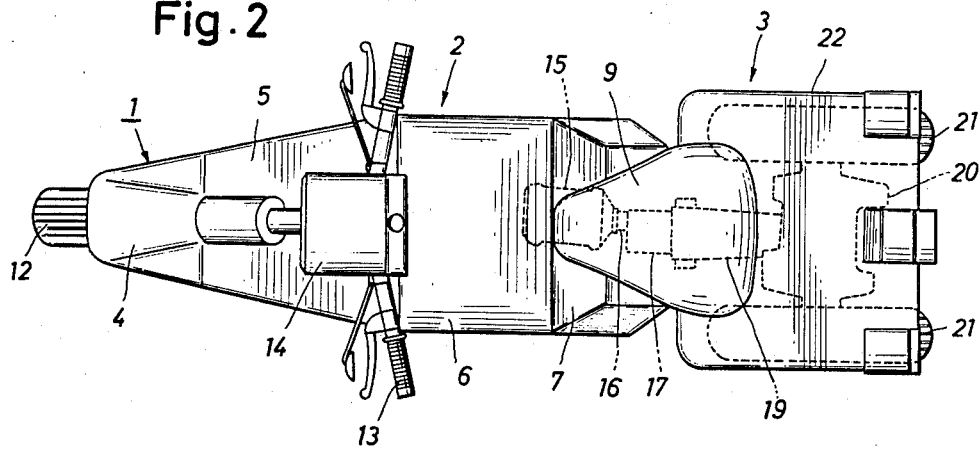

BACKGROUND OF THE INVENTION

1. Field of the Invention

The present invention relates to a structure for mounting a drive unit including an engine on a vehicle.

2. Description of Relevant Art

A proposed drive unit mounting structure suitable for use on a substantially small-sized three-wheeled vehicle having a front wheel and a pair of rear wheels is known. In this known vehicle a rear fork is pivotally supported on a rear portion of a vehicle body, a drive unit including an engine is mounted on the rear fork, and the rear wheels are drivably connected to the drive unit on respective opposite sides thereof. The drive unit as well as the rear wheels are not spring-mounted, and the weight thereof amounts to one-third to one-half of the entire weight of the vehicle. Further, the small-sized vehicle is not normally provided with a hydraulic damper in its cushioning system which provides sufficient dampening effects. Normally, a vibration-dampening structure is employed to reduce relatively fine vibrations of the drive unit between the drive unit, especially the engine, and the rear fork that supports the engine thereon. Such vibration-dampening structure tends to amplify a relative pivotal movement between the engine and the rear fork. When such a vehicle is in motion and is suddenly braked by applying a large braking force to the driven rear wheels, the vehicle tends to hop at the rear wheels. Such hopping is difficult to control or suppress because sufficient shock-dampening action is not provided, thus causing discomfort to the driver during vehicle operation in further view of the fact that the spring-supported weight of the vehicle is small in comparison with the weight thereof which is not spring-supported.

SUMMARY OF THE INVENTION

The present invention provides a drive unit mounting structure wherein a rear fork is pivotally connected at one end thereof to the body of a vehicle and a drive unit including an engine is pivotally mounted at a rear portion thereof on the other end of the rear fork. A wheel is drivably coupled to the drive unit, and first link means are provided having one end pivotally connected to a front portion of the drive unit and the other end pivotally connected to the rear fork, the link means having a longitudinal axis directed obliquely, when viewed in side elevation, toward a point where the wheel contacts the ground.

In a preferred embodiment, the first link means includes a link plate, a bearing provided between the one end of the link plate and a shaft supporting the front portion of the drive unit, and a damper member in the form of a rubber mount is provided between the other end of the link plate and a shaft supported by the rear fork.

It is an object of the present invention to provide a drive unit mounting structure wherein vibrations of a drive unit in operation are effectively dampened, and hopping movements of the driving unit when the vehicle is suddenly accelerated or braked are effectively suppressed.

Another object of the present invention is to provide a vehicle having a drive unit mounted reliably on a rear fork which is pivotally connected to a vehicle body.

The above and further objects, features and advantages of the present invention will become apparent from the following detailed description when read in conjunction with the accompanying drawings which illustrate a preferred embodiment of the present invention by way of example.

BRIEF DESCRIPTION OF THE DRAWINGS

FIG. 1 is a side elevational view of a vehicle to which the mounting structure in accordance with the present invention is applied.

DETAILED DESCRIPTION OF PREFERRED EMBODIMENTS

Figure 2:
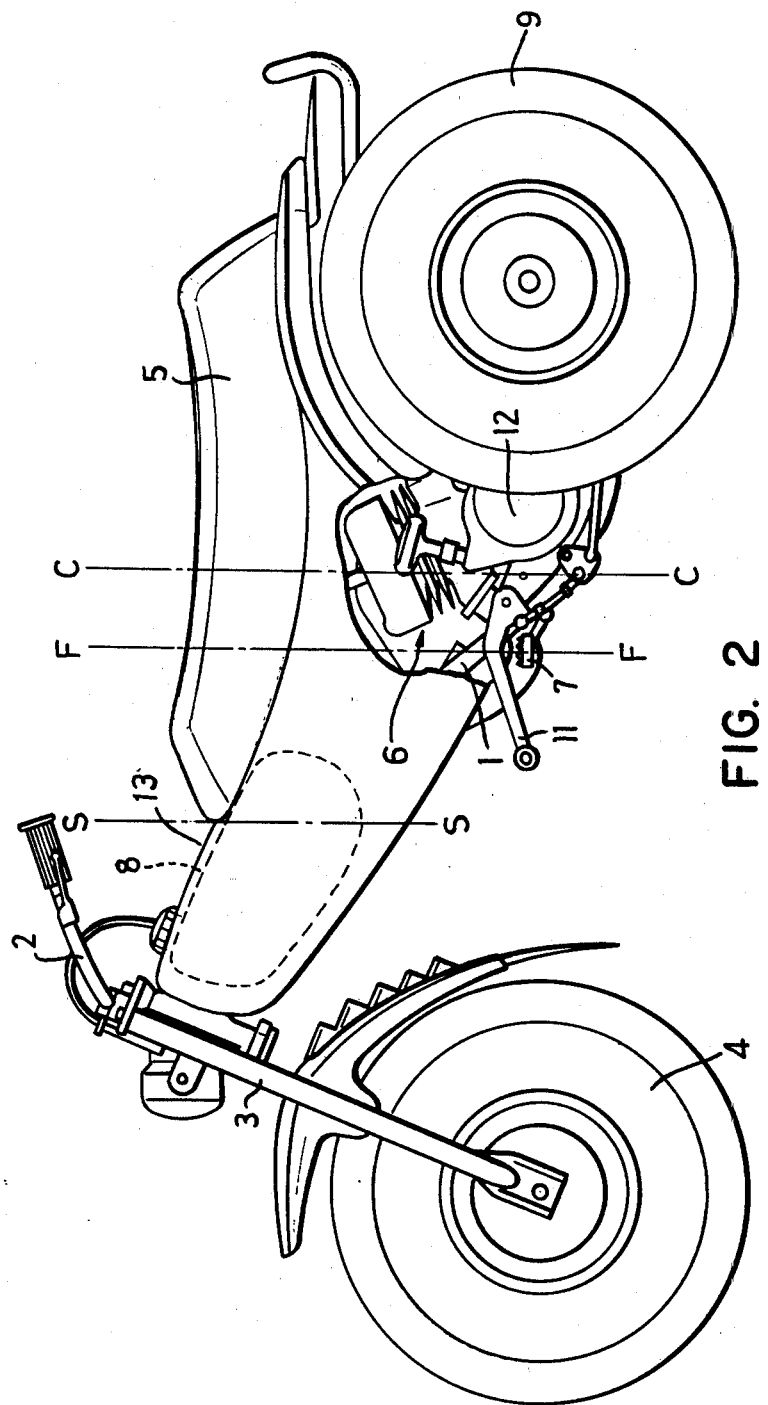
FIG. 2 is a plan view of the vehicle shown in FIG. 1.

As shown in FIGS. 1 and 2, a three-wheeled vehicle 1 generally comprises a front body 2 and a rear body 3 which are coupled together. The front body 2 has a front fender 4, a slanted floor portion 5 extending rearwardly from the front fender 4, a flat footrest floor portion 6 extending rearwardly and horizontally from the slanted floor portion 5, a foot guard 7 raised upwardly from a rear portion of the footrest floor portion 6, a seat post 8 extending upwardly from the foot guard 7, and a driver's seat 9 mounted on the seat post 8. A post 11 is attached to the slanted floor portion 5 for supporting a front fork 10 which supports a front steerable wheel 12. The front fork 10 is controlled by a steering handlebar 13 attached to an upper end thereof. A casing 14 which houses a headlight, instrumentation such as meters, etc., is also mounted on the upper end of the front fork 10.

The rear body 3 comprises a rear subframe 17 fixed to a shaft 16 which is pivotally and rotatably supported by a coupling 15 disposed beneath and mounted on a rear end portion of the footrest floor portion 6. A rear fork 19 is pivotally connected at a front end portion thereof to the subframe 17 by a horizontal transverse shaft 18, and supports thereon a drive unit 20 which is coupled to a pair of rear driving wheels 21, 21 disposed respectively on opposite sides of the drive unit 20. The drive unit 20 and the rear driving wheels 21, 21 are covered by a rear fender 22 connected at its front end portion to a forwardmost end portion of the rear fork 19.

Figure 3:
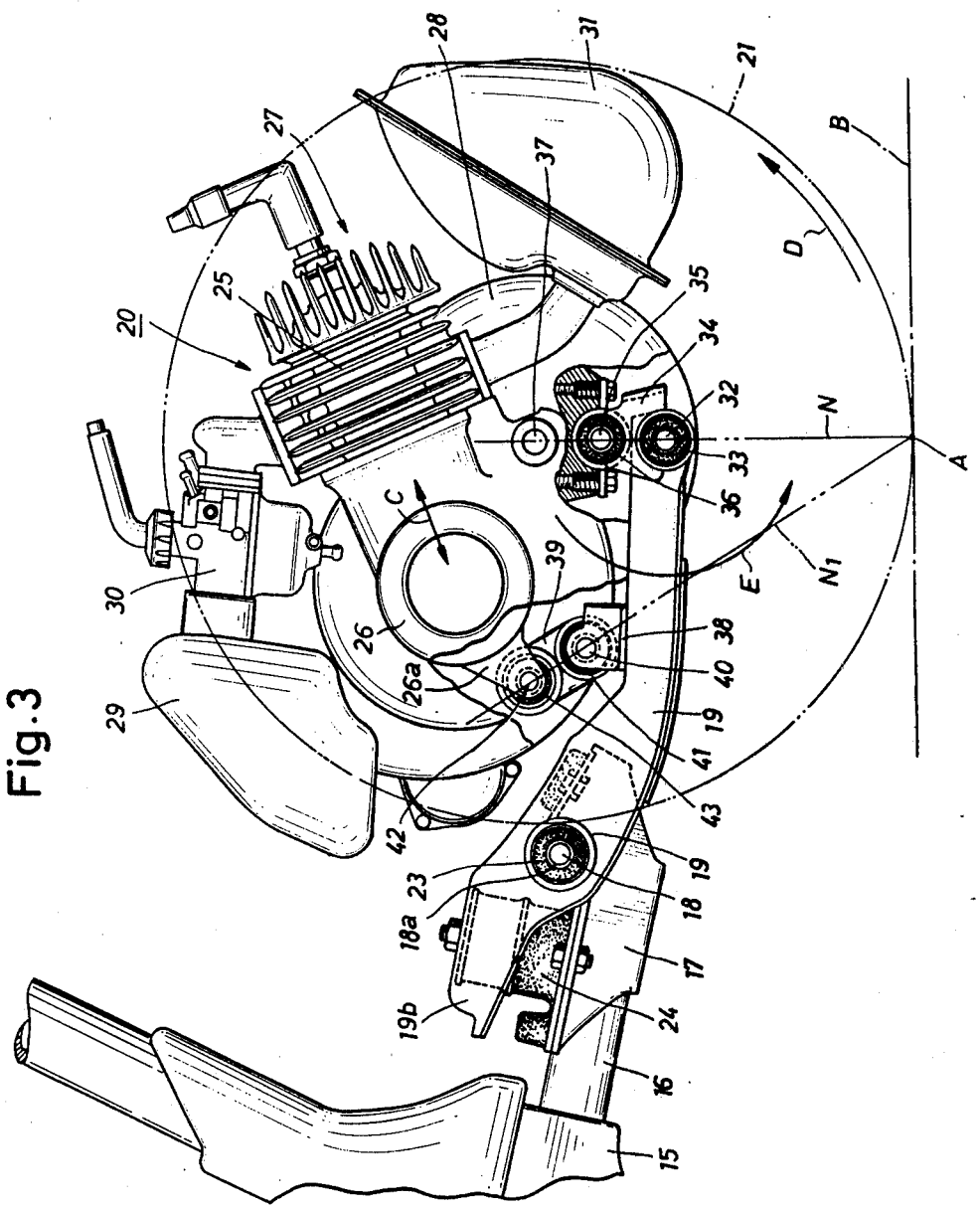
FIG. 3 is an enlarged side elevational view, with parts broken away, of a drive unit mounting structure of the vehicle.

As shown in FIG. 3, the drive unit 20 includes an engine 27 having a cylinder 25 and a crank case 26, and further includes transmission case 28 provided integrally with the engine 27, an aircleaner 29, a carburetor 30, and a muffler 31.

Figure 4:
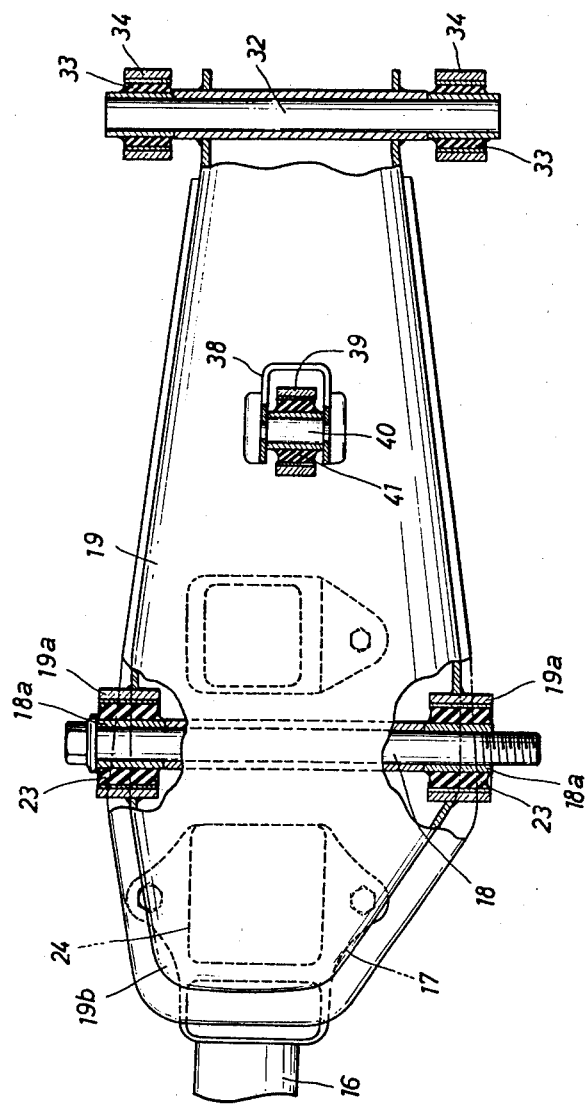
FIG. 4 is an enlarged plan view, with parts in cross section, of a rear fork of the vehicle.

In FIGS. 3 and 4, a rubber mount or bushing 23 is interposed between the shaft 18 and a boss or sleeve 19a which is provided on the rear fork 19 and through which the shaft 18 extends. The rubber mount 23 is fixed as by burning to the outer periphery of a collar 18a fitted around the shaft 18 and to the inner periphery of the boss 19a. A cushioning rubber member 24 is disposed between a portion 19b of the rear fork 19 extending forwardly of shaft 18, and the rear subframe 17, for dampening pivotal movements of the rear fork 19 about the shaft 18 and thus reducing shocks resulting from such pivotal movements.

A horizontal transverse shaft 32 is mounted on the rear fork 19 at a rear end portion thereof. A pair of rubber mounts or bushings 33, 33 (FIG. 4) are fitted over the shaft 32 in laterally spaced relation. A pair of rear link plates 34, 34 are pivotally carried at lower ends on the shaft 32 through the mounts 33, 33, respectively. Upper ends of the link plates 34, 34 are also pivotally carried on either end of a horizontal transverse shaft 35 through a pair of rubber mounts 36, respectively. The shaft 35 is disposed beneath and mounted on a lower side of the transmission case 28. Thus, the drive unit 20 is pivotable about both the shafts 34, 35 which are interconnected by the link plates 34, 34, at the rear end portion of the rear fork 19. A drive shaft 37 which is connected to the rear driving wheels 21, 21, extends transversely through the transmission case 28 and is positioned substantially on an imaginary line N which extends vertically through the shafts 32, 35, on which the weight of the drive unit 20 is applied. The engine cylinder 25 has an axis tilted with respect to the horizontal plane such that a cylinder head is directed rearwardly and upwardly and so that the crank case 26 is disposed at a forward lower portion of the drive unit 20. Accordingly, during operation thereof, the engine 27 vibrates in the direction of the arrow C (FIG. 3) due to reciprocating movement of an engine piston.

A bracket 38 is mounted centrally in the width direction on the rear fork 19 at a longitudinally intermediate position thereof. The bracket 38 supports a shaft 40 around which a lower end of a front link plate 39 is pivotably connected by a rubber mount or bushing 41. The link plate 39 has an upper end also pivotably connected via a bearing 43 around a shaft 42 mounted on a boss 26a formed on the crank case 26. The shaft 42 is positioned forwardly and upwardly of the shaft 40 so that the link plate 39, in the normal state of equilibrium is tilted with its upper end disposed forwardly and its lower end rearwardly. The link plate 39 has a longitudinal axis $N_1$ directed obliquely, when viewed in side elevation (FIG. 3), toward a point A at which the wheels 21, 21 contact the ground B, or the point at which the vertical weight line N meets the ground B. Although it is preferred that the axis $N_1$ pass through the point A, the axis $N_1$ may cross an extension of the line N even when the axis $N_1$ does not pass through the point A. With the arrangement described hereinabove, the drive unit 20 is pivotally supported at its front and rear portions on the rear fork 19 by the front and rear link plates 39, 34 equipped with the damper mounts 41, 33, 36.

When the vehicle 1 is braked with the wheels 21, 21 rotating in the direction of the arrow D (FIG. 3), the drive unit 20 is initially pivotably moved forwardly and downwardly in the direction of the arrow E about the shaft 32, and thereafter, rearwardly about the shaft 32 due to the inertia of the wheels 21, 21. Such initial movement of the drive unit 20 in the direction of arrow E is substantially along the longitudinal axis of the link 39 which is thus pushed and acts to resist such movement. The second rearward movement of the drive unit is also resisted by the link 39, which is then pulled longitudinally. With the drive unit 20 being thus restricted in motion by the link 39, the drive unit 20 is urged to move downwardly toward the point A on the ground B, whereupon the wheels 21, 21 are pressed downwardly against the ground B. Accordingly, even when the vehicle 1 is subjected to hopping when it is braked, such hopping movement is effectively controlled and suppressed. Thus, the driver of the vehicle 1 is provided with improved riding comfort while driving the vehicle, and the aforesaid hopping is suppressed even if the vehicle 1 is equipped with a brake having increased braking capability.

The engine 27 in operation tends to vibrate primarily in the direction of the arrow C, which is substantially perpendicular to the axis $N_1$ of the link 39. Such vibrations of the engine 27 cause the link 39 to move pivotably, whereupon the rubber mount 41 is twisted so as to absorb and dampen the vibrations of the engine 27. The rubber mounts per se also dampen the vibrations in the other directions of the engine 27. The drive unit mount structure in accordance with the invention thus dampens or reduces vibrations of the engine in operation, as well as movements of the engine when the vehicle is accelerated or braked. Thus, improved riding comfort is provided, particularly by eliminating the tendency of vehicle 1 to hop when it is braked.

While in the illustrated embodiment the link 39 is shown as being supported by the bearing 43 at one end and the rubber mount 41 at the other end, the link 39 may be supported by rubber mounts at both ends. Two of the front links 39 may be provided so as to be coaxially arranged on opposite respective sides of the drive unit 20, and the rear links 34, 34 may be replaced with a single link disposed centrally in the width direction of the drive unit 20. Further, the present invention is applicable to a two-wheeled vehicle or motorcycle, a three-wheeled vehicle with two front wheels and a single rear wheel, and a four-wheeled vehicle, provided such vehicles have a rear fork which is pivotably connected to a vehicle body and support a drive unit.

Although a certain preferred embodiment of the present invention has been shown and described in detail hereinabove, it will be understood that many changes and modifications may be made therein without departing from the scope of the appended claims.

We claim:

1. A drive unit mounting structure, comprising:
    a body of a vehicle;
    a rear fork pivotably connected at one end thereof to said body;
    a drive unit pivotably mounted at a rear portion thereof on the other end of said rear fork;
    a rear wheel drivably coupled to said drive unit; and
    first link means having one end pivotably connected to a front portion of said drive unit and the other end pivotably connected to said rear fork, one of said pivotably connected ends of said first link means being disposed forwardly and upwardly of the other of said pivotably connected ends in the normal state of equilibrium of said mounting structure, such that said link means has a longitudinal axis directed obliquely, when viewed in side elevation, toward a point where said rear wheel contacts the ground.

2. A drive unit mounting structure according to claim 1, further comprising:
    second link means having one end pivotably connected to said other end of said rear fork.

3. A drive unit mounting structure according to claim 1, wherein:
    said first link means includes a link plate, a bearing provided between said one end of said link plate and a member supporting said front portion of said drive unit, and a damper member provided between said other end of said link plate and a member supported by said rear fork.

4. A drive unit mounting structure according to claim 3, wherein:
said damper member provided between said other end of said link plate and said member supported by said rear fork comprises a rubber mount.

5. A drive unit mounting structure according to claim 1, wherein:
said first link means includes a first link plate, a bearing provided between said one end of said first link plate and a member supporting said front portion of said drive unit, and a damper member provided between said other end of said first link plate and a member supported by said rear fork; and
said mounting structure further includes second link means comprising a second link plate having one end thereof pivotably connected to a member mounted on said other end of said rear fork and the other end thereof pivotably connected to a member mounted on a lower rear side portion of said drive unit, and a damper member provided between said one end of said second link plate and said member mounted on said other end of said rear fork and between said other end of said second link plate and said member mounted on said lower rear side portion of said drive unit.

6. A drive unit mounting structure according to claim 5, wherein:
each of said damper members comprises a rubber mount.

7. A drive unit mounting structure according to claim 5, wherein:
said second link means includes a pair of said second link plates.

* * * * *